W. P. BORDER.
COMBINATION HEAD GATE AND WATER MEASURING DEVICE.
APPLICATION FILED MAY 10, 1911.
1,062,432.
Patented May 20, 1913.
2 SHEETS—SHEET 1.
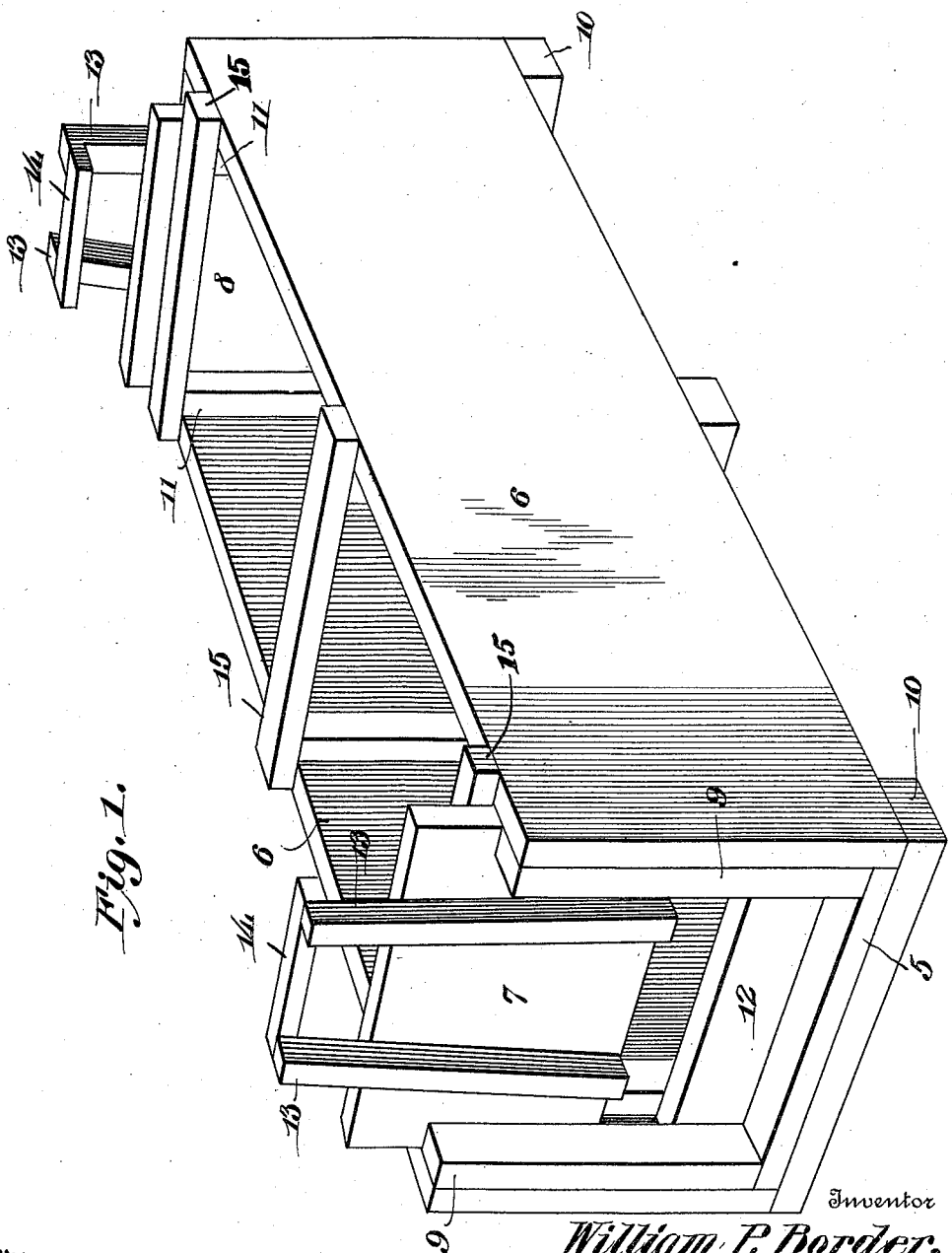

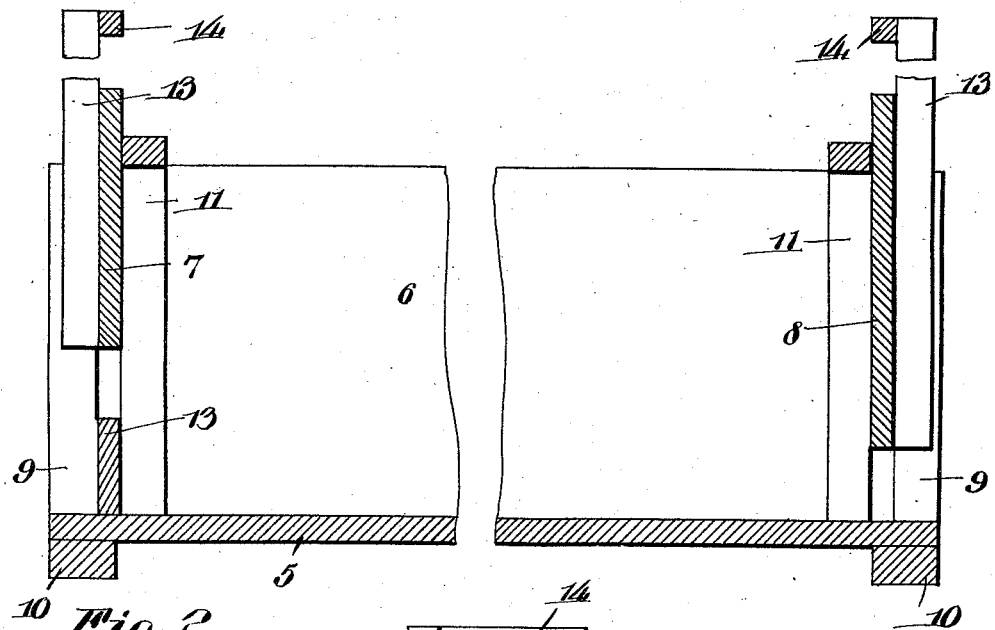
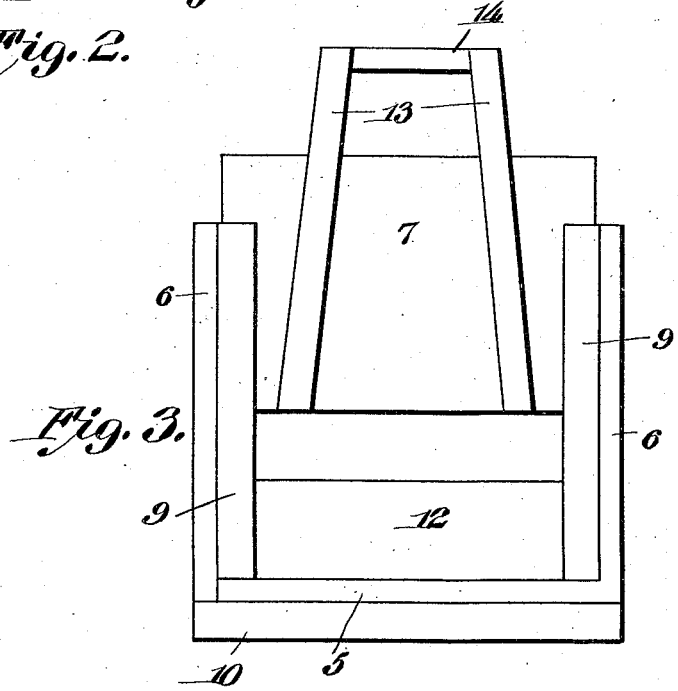

UNITED STATES PATENT OFFICE.

WILLIAM P. BORDER, OF BOZEMAN, MONTANA.

COMBINATION HEAD-GATE AND WATER-MEASURING DEVICE.

1,062,432.

Specification of Letters Patent.

Patented May 20, 1913.

Application filed May 10, 1911. Serial No. 626,304.

*To all whom it may concern:*

Be it known that I, WILLIAM P. BORDER, a citizen of the United States, residing at Bozeman, in the county of Gallatin and State of Montana, have invented new and useful Improvements in Combination Head-Gate and Water-Measuring Devices, of which the following is a specification.

The invention relates to a combination headgate and water measuring device, and more particularly to the class of apparatus for measuring flowing water.

The primary object of the invention is the provision of a measuring apparatus of this character in which water within a ditch or other water bed may be measured, so as to determine with accuracy the quantity of still water contained within the ditch or the like.

Another object of the invention is the provision of a measuring apparatus adapted especially for measuring water in irrigation ditches which can be constructed at a minimum expense, thereby permitting the same to be installed economically for efficient service, the structure being simple, strong and durable.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a perspective view of an apparatus constructed in accordance with the invention. Fig. 2 is a vertical longitudinal sectional view thereof. Fig. 3 is an end elevation.

Similar reference characters indicate corresponding parts throughout the several views of the drawings.

Referring to the drawings by numerals, the measuring device comprises a box-like body, including a bottom 5, side sections 6, and rising and falling measuring and regulating end gates 7 and 8, respectively, the side sections 6 being secured to vertical uprights 9 rising from the bottom 5 interiorly of the body, the bottom 5 being fixed to outer and intermediate cross sills 10 adapted to rest upon the bed of the ditch, when the body is placed therein. The end gates 7 and 8 are slidably fitted between the vertical uprights 9 and vertical guide cleats 11 spaced therefrom and arranged in parallelism therewith, the said gates being adapted to have vertical adjustment, whereby the same may be raised or closed at will, and when in raised position, open the ends of the body for the inflow of water thereinto.

Rising from the bottom, between the uprights 9 and the cleats 11, at the measuring end of the body, is a flash board 12 which impedes the flow of the water on the opening of the measuring gate 7, so that the water entering the body will be brought to a stand still within the body of the measuring apparatus, thus enabling the easy measuring of the water in the ditch.

It is of course understood that when the measuring apparatus is placed within the irrigating ditch, the regulating gate is disposed upstream, and the measuring gate disposed downstream, the regulating gate being raised for the opening thereof, and likewise the measuring gate is opened the required distance, so that water passing through the space between the flash board and the said measuring gate may be determined in quantity.

Fixed to the outer faces of the measuring and regulating gates 7 and 8 are upwardly converging beams 13, the same rising a slight distance above the upper edges of the said gates and having fixed thereto cross bars 14 which enable the said gates to be raised and lowered in a convenient manner. Also fixed transversely of the box-like body and secured to the upper edges of the side sections 6 are cross rails 15, one medially thereof, the others being disposed contiguous to the said gates 7 and 8 to reinforce the same at the upper open top of the box like body.

From the foregoing description, it will be apparent that the apparatus is designed, so that water passing through an irrigating ditch or other canal may be easily and expeditiously measured, and a more extended explanation is deemed unnecessary.

What is claimed is:

The herein described measuring apparatus, comprising a box-like body having opened ends, a regulating gate mounted in one end of the body for vertical sliding movement, a measuring gate mounted in the other end of the body for vertical sliding movement, said gates being provided on their outer faces with upwardly converging longitudinally extending beams, the same rising a slight distance above the transverse edges of said gates, cross bars fixed to the upper ends of the opposed faces of the beams and disposed in spaced parallel relation with the uppermost transverse edges of said gates, a flash board below the measuring gate and a plurality of cross rails, said rails being mounted upon the upper longitudinal edges of the side sections of the box-like body, one of said cross rails being disposed at a point intermediate of the body while the other of said rails are disposed at points adjacent to the said gates thereby reinforcing the same at the open top of the box-like body.

In testimony whereof I affix my signature in presence of two witnesses.

WILLIAM P. BORDER.

Witnesses:
   H. M. STEWART,
   IRAY PARK.

Copies of this patent may be obtained for five cents each, by addressing the "Commissioner of Patents, Washington, D. C."